United States Patent
Horst

(10) Patent No.: US 12,487,216 B2
(45) Date of Patent: Dec. 2, 2025

(54) $CO_2$ SENSOR AND METHOD OF SENSING $CO_2$

(71) Applicant: Horst Tech, LLC, Bellevue, WA (US)

(72) Inventor: Robert W. Horst, Bellevue, WA (US)

(73) Assignee: Horst Tech, LLC, Bellevue, WA (US)

(*) Notice: Subject to any disclaimer, the term of this patent is extended or adjusted under 35 U.S.C. 154(b) by 592 days.

(21) Appl. No.: 17/745,737

(22) Filed: May 16, 2022

(65) Prior Publication Data

US 2022/0365048 A1 Nov. 17, 2022

Related U.S. Application Data

(60) Provisional application No. 63/189,329, filed on May 17, 2021.

(51) Int. Cl.
| | | |
|---|---|---|
| G01N 33/00 | (2006.01) | |
| G01N 21/3504 | (2014.01) | |
| G01N 27/12 | (2006.01) | |
| G01N 29/24 | (2006.01) | |

(52) U.S. Cl.
CPC ....... G01N 33/004 (2013.01); G01N 21/3504 (2013.01); G01N 27/125 (2013.01); G01N 29/2418 (2013.01); G01N 33/0063 (2013.01); G01N 2201/062 (2013.01)

(58) Field of Classification Search
CPC .................................................. G01N 33/004
USPC ....................................................... 73/24.02
See application file for complete search history.

(56) References Cited

U.S. PATENT DOCUMENTS

| | | |
|---|---|---|
| 9,109,981 B2 | 8/2015 | Sharp |
| 10,830,466 B2 | 11/2020 | Secor |
| 11,051,701 B1 | 7/2021 | Gaines et al. |
| 2015/0212057 A1 | 7/2015 | Darveau |
| 2018/0188218 A1* | 7/2018 | Sohn ................. G01R 13/0209 |
| 2020/0116615 A1* | 4/2020 | Bertini ................... G01N 11/02 |
| 2020/0232959 A1* | 7/2020 | Armitage ................ E21B 41/00 |

(Continued)

FOREIGN PATENT DOCUMENTS

| | | | |
|---|---|---|---|
| CA | 3170582 | 9/2021 | |
| CN | 110503348 A | * 11/2019 | ......... G01N 33/0062 |

OTHER PUBLICATIONS

Zou. Machine translation of CN110503348A. Published Nov. 2019. Accessed Sep. 2024. (Year: 2019).*

(Continued)

*Primary Examiner* — Walter L Lindsay, Jr.
*Assistant Examiner* — Philip T Fadul
(74) *Attorney, Agent, or Firm* — Knobbe, Martens, Olson & Bear, LLP

(57) ABSTRACT

A wearable $CO_2$ monitor and stale air dosimeter comprising a power supply with rechargeable battery and battery charger, an accurate $CO_2$ sensor, a fast-reacting $CO_2$ sensor, programmable control circuitry, and a user interface for presenting results and indications. The accurate $CO_2$ sensor provides $CO_2$ levels which are used to compute staleness levels and further accumulated as a staleness dose. The fast-reacting $CO_2$ sensor alerts the user to changes in $CO_2$ levels and allows the accurate $CO_2$ sensor to be powered down during periods when $CO_2$ levels are stable.

10 Claims, 8 Drawing Sheets

(56) References Cited

U.S. PATENT DOCUMENTS

| | | |
|---|---|---|
| 2020/0258606 A1 | 8/2020 | Ferentz et al. |
| 2021/0077836 A1* | 3/2021 | Ferraro .............. G01N 33/0063 |
| 2021/0132037 A1 | 5/2021 | Kanazawa |
| 2021/0182641 A1 | 6/2021 | Juhala |
| 2022/0366429 A1 | 11/2022 | Pati |
| 2024/0160682 A1 | 5/2024 | Horst |

OTHER PUBLICATIONS

Chen et al., "The Carbon Dioxide Concentration Detection Using Mobile Phones Combine Bluetooth and QR Code", University of Illinois: IEEE Xplore, Downloaded Oct. 3, 2022, in 6 pages.

Fazackerley et al., "Bridging the Last Mile: Utilizing QR codes, e-Paper and Smartphones to LinkLow-Power IoT Data Collection Devices to the Internet", IEEE Sensors Applications Symposium (SAS), 2021, in 6 pages.

Daisey et al., "Indoor Air Quality, Ventilation And Health Symptoms In Schools: An Analysis Of Existing Information" Indoor Air, 2003, Lawrence Berkeley National Laboratory-48287, pp. 1-20.

Godwin et al., "Indoor Air Quality in Michigan Schools" Indoor Air, 2007, vol. 17 pp. 109-121.

Grontoft et al., "Assessment Of Indoor Air Quality And The Risk Of Damage To Cultural Heritage Objects Using Memori Dosimetry", Studies on Conservation, 2016, vol. 61, pp. 70-82.

GMD/W20 Series Carbon Dioxide Transmitters for Demand Controlled Ventilation Applications-Datasheet, 2009, 2 pages.

Pino et al., "Measuring Co2 with Arduino: Creating A Low-Cost Pocket-Sized Device With Flexible Applications That Yields Benefits For Students And Schools", Journal Chemical Education, 2019, vol. 96, pp. 377-381.

Sensirion SCD4x Breaking the size barrier in CO2 sensing Datasheet, www.sensirion.com, Version 1.1, Apr. 2021, 22 pages.

* cited by examiner

| NDIR Sleeping | MOX Stable | NDIR Stable | Action |
|---|---|---|---|
| 0 | 0 | X | Display MOX value and indicate that values are changing |
| 0 | 1 | 0 | Display MOX value while NDIR warms up |
| 0 | 1 | 1 | Display NDIR value. Periodically calibrate MOX output value to match the stable NDIR value. Power down the NDIR if in power save mode. |
| 1 | 0 | X | Display the MOX output value and power up NDIR |
| 1 | 1 | X | Display MOX output value while NDIR sleeps to save power |

Fig. 4B

$CO_2$ SENSOR AND METHOD OF SENSING $CO_2$

CROSS-REFERENCE TO RELATED APPLICATIONS

This application claims the benefit of priority under 35 U.S.C. § 119 of U.S. Provisional Patent Application No. 63/189,329, filed May 17, 2021 and titled "WEARABLE $CO_2$ MONITOR AND STALE AIR DOSIMETER," which is herein incorporated by reference in its entirety.

BACKGROUND

Field

Embodiments of the invention relate generally to devices for monitoring the freshness or staleness of ambient air by measuring the amount of carbon dioxide ($CO_2$) in the vicinity of a user of the device.

Description of the Related Technology

TVOC and $CO_2$ Sensors

Air sensors can be used to directly or indirectly indicate potential health risks. For example, air sensors can directly measure total volatile organic compounds (TVOC). VOCs are emitted as gases from certain solids or liquids and can include a variety of chemicals, some of which may have short-term and long-term adverse health effects. VOCs are emitted by ingredients in paints, varnishes, waxes, cleaning products, disinfectants, cosmetics, and/or fuels.

Health risks can also be measured indirectly by measuring $CO_2$ levels which correlate with human occupancy, and hence the risk of becoming ill through exposure to a communicable disease. Direct measurement of the pathogens causing these diseases is typically not possible due to the small size and diversity of the pathogens. $CO_2$ levels can be measured to provide a measure of the risk of exposure to diseases carried by others, because exhaled air both increases $CO_2$ levels and increases the levels viruses or bacteria spread by those who are infected. Spaces with better ventilation reduce both the $CO_2$ level and the amount of pathogens. High levels of $CO_2$ are also known to cause other side effects such as headaches, loss of sleep, and reduced cognitive function.

Dosimetry

Dosimetry is commonly associated with monitoring accumulated radiation exposure but has not been widely applied to the exposure to poor air quality exposure. Some air quality dosimetry has been developed for museums to measure exposure to museum collections, but these techniques have not been applied to other settings.

Wearable Air Sensors

Wearable air sensors have been developed for detecting unhealthy levels of particulate matter and dangerous gasses, but to date these have not addressed the unique requirements of wearable $CO_2$ sensors.

SUMMARY

Embodiments of the invention relate generally to devices for monitoring the freshness or staleness of ambient air by measuring the amount of $CO_2$ in the vicinity of a user of the device.

Such $CO_2$ monitoring devices can detect and alert the user when ventilation is inadequate for the number of occupants of a room. A dosimeter function accumulates exposure to stale air to provide an alerting based on high average exposure. The real time monitor and dosimeter can help to set standards for exposure to stale air in work environments, schools and homes. Knowledge about whether the air is predominantly fresh or stale gives the user timely feedback on the safety of spending time in such environments. With knowledge of the $CO_2$ level, a user can avoid high exposure to potential sources of airborne diseases caused by viruses too small to completely filter with facemasks or typical HVAC filters. Monitoring $CO_2$ levels in homes can alert users of the need to increase ventilation to avoid symptoms of high $CO_2$ levels including headaches, loss of sleep, and reduced cognitive levels. A compact, low power, wearable monitor provides exposure measurements near the user with no dependency on HVAC or room monitors which may be located at places that do not adequately reflect the actual air quality at the user's location. The device can also serve as a platform for others sensors to measure temperature, humidity, volatile organic compounds, particulate matter, carbon monoxide and other gases.

Until the present invention, there have been no air quality dosimeters with the low cost, long battery life, accuracy and wearability required to allow an individual to monitor accumulated exposure to environments with high $CO_2$ levels.

Embodiments of the present invention use existing sensor and embedded system technologies, combining them in a unique way to give unexpected and beneficial results in a wearable sensor that can be used to quickly determine the risks of entering spaces with stale air, and to provide feedback and alerts based on accumulated exposure to stale air.

The $CO_2$ sensing function is incorporated into a wearable device and implemented in a manner that provides results with the required reaction time, accuracy, low cost and battery life.

To date, other portable air sensors have lacked the features provided by embodiments of the current invention. Embodiments of the current invention provide fast, accurate results in a device that can be worn like name badge or carried in a shirt pocket or purse exposed to the surrounding air. The sensor has power dissipation low enough to require recharging only after a typical day's use, and hence can accumulate the stale air dosage over a full working day. Recharging can be done through a standard Universal Serial Bus (USB) connection, through a magnetically attached charger that allows it to measure room air quality while recharging, and/or through any other suitable interface.

It is therefore an object of the invention to provide a measurement of $CO_2$ levels that reacts quickly to changes yet retains absolute accuracy to allow comparisons between different environments.

It is a further object of the invention to provide a device that measures the concentration of gases while also accumulating exposure and presenting the real time accumulation as a dosimeter measurement.

It is a further object of the invention to provide a wearable, battery powered monitor of $CO_2$ to allow continuous measurements in the vicinity of the person wearing the device.

Embodiments of the current invention provide a battery-powered, wearable monitor that monitors $CO_2$ levels to measure the staleness of the air and give alerts when entering spaces that may not be adequately ventilated.

In some embodiments, the device is operated with two buttons. A short press of the left button powers it on and a 3-second press powers it off. The left button is also used to change settings.

The right button scrolls between different screens. In User mode, it scrolls between screens displaying the $CO_2$ level in parts per million, staleness and dosage of stale air, a graph of recent air staleness, and TVOC levels in parts per billion. The right button can also select a mode which periodically cycles through these four displays. On any screen a short press of the left button enters the settings screen which allows the user to scroll through various preferences and settings including User/Expert mode, Full Power/Power Save, settings for an optional interface to log results, and enabling/disabling the LEDs and alerts. Expert mode includes other screens including one that shows current readings from a fast $CO_2$ sensor (for example, MOX) and a slower but more accurate $CO_2$ sensor (for example, NDIR or photoacoustic).

Many screens include a battery indicator that shows charge level on battery power. The battery indicator blinks a lightning bolt during charging when the charge level has not yet reached 95%.

Screens showing $CO_2$ levels and Staleness blink the heading or show arrows when values are changing. The headings stop blinking, or arrows disappear, when the readings have stabilized.

In one aspect, a battery-powered carbon dioxide ($CO_2$) sensor is disclosed. The sensor can include a first sensor that is configured to provide $CO_2$ measurements to generate a $CO_2$ level. The sensor can include a second sensor that is configured to provide an indicator of changes in the $CO_2$ level. The second sensor is faster than the first sensor in responding to a $CO_2$ concentration change. The first sensor is configured to provide a higher accuracy $CO_2$ concentration value than the second sensor. The sensor can include a user interface that is configured to present a combined sensor result of the first sensor and the second sensor.

In another aspect, a method of measuring air quality exposure risks is disclosed. The method can include measuring carbon dioxide ($CO_2$) with a first sensor to produce a $CO_2$ level and a staleness level from the $CO_2$ level. The method can include accumulating staleness levels over time to determine a staleness dose. The method can include presenting the staleness level and the staleness dose on a user interface.

BRIEF DESCRIPTION OF THE DRAWINGS

FIG. 4B is a table showing states of the MOX sensor and the NDIR sensor of FIG. 4A, and actions corresponding to the states.

DETAILED DESCRIPTION OF EMBODIMENTS

Figure 1:
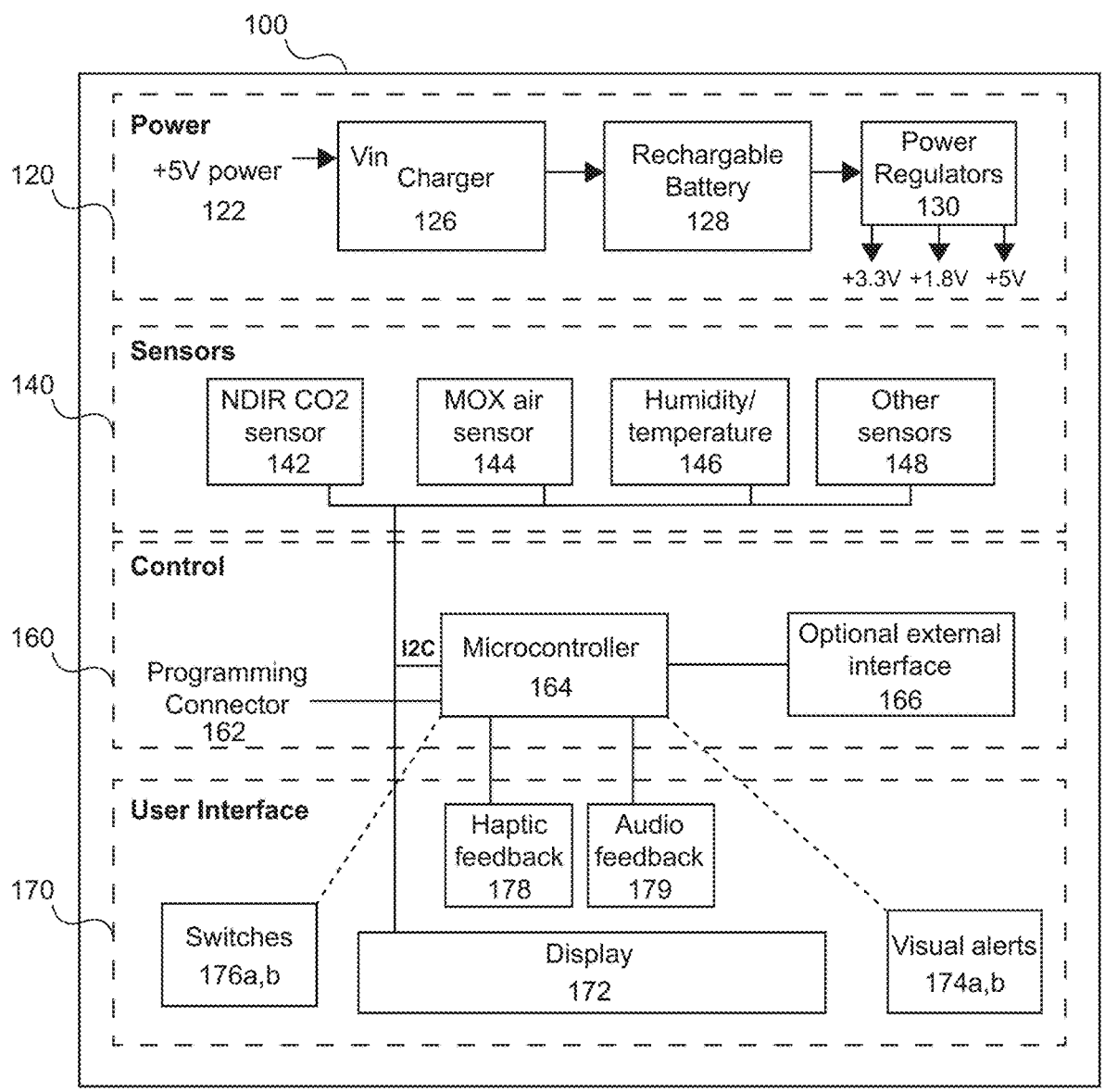
FIG. 1 is a block diagram of one embodiment of the air monitor.

The following detailed description of embodiments presents various descriptions of specific embodiments of the invention. However, the invention can be embodied in a multitude of different ways as defined and covered by the claims. In this description, reference is made to the drawings in which like reference numerals may indicate identical or functionally similar elements.

MOX (metal oxide) sensors may be used to measure TVOC levels. Some MOX sensors also produce estimated $CO_2$ levels, but MOX sensors typically do not differentiate $CO_2$ from other organic compounds that can cause increased readings. Commercially available MOX sensors include, but are not limited to, the ZMOD4410 (Renesas Electronic Corporation), SGP30 (Sensirion AG), and CCS811 (AMS AG). MOX sensors are typically designed into small surface-mount integrated circuit components with dimensions of only a few square millimeters. These sensors react to the air in a small inlet and react quickly to $CO_2$ concentration changes. MOX sensors also have very low power dissipation because a small heater element is used, thereby requiring low power to keep the sensing element at the appropriate temperature.

A disadvantage of MOX sensors is that they are not selective to $CO_2$ and the $CO_2$ estimates are affected by volatile organic compounds such as alcohol, formaldehyde, and/or biological contaminants. The absolute values of MOX sensors may also be affected by humidity and temperature variations in the environment. For these reasons, MOX sensors are useful for relative $CO_2$ measurements but do not give measurements that can be easily translated to human occupancy, and hence risk of airborne viruses or health conditions related to $CO_2$ levels.

$CO_2$ levels can be more accurately measured using non-dispersive infrared (NDIR) sensors. Commercially available NDIR $CO_2$ sensors include the MH-Z19 (Zhengzhou Winsen Electronics Technology Co., Ltd), SCD3x (Sensirion AG), K30 (Senseair), CM1106 (Cubic Sensor and Instrument Co., Ltd.), CDM7160 (Figaro Engineering Inc.) and Telaire T6703 and T6713 (Amphenol). NDIR sensors are more selective to $CO_2$ and remain accurate across temperature and humidity changes, but they have larger air chambers and are slower to react to changes in $CO_2$ concentration. The internal light and heat sources of NDIR sensors typically require more power and dissipate more heat than MOX sensors. NDIR sensors may take up to several minutes to react to rapid substantial changes in $CO_2$ levels such as those that occur when entering a crowed building from clean, outdoor air. The long delay limits the utility of NDIR sensors for portable air monitoring.

Another example of a sensor that can more accurately measured $CO_2$ than the MOX senor is a photoacoustic sensor. The photoacoustic sensor may measure $CO_2$ more slowly than the MOX sensor. The photoacoustic sensor may measure $CO_2$ more accurately and more quickly as compared to the NDIR sensor. In some embodiments, the photoacoustic sensor can include SCD4x manufactured by Sensirion.

Various embodiments disclosed herein can include two or more types of sensors (e.g., a combination of a MOX sensor with an NDIR sensor and/or a photoacoustic sensor) and combines their outputs in a way that takes advantage of the fast reaction speed and low power of the MOX sensor as well as the accuracy and temperature/humidity compensation of the NDIR sensor and/or the photoacoustic sensor.

FIG. 1 shows a block diagram of one embodiment of an air monitor. The air monitor is partitioned into sections related to power section 120, sensors section 140, control section 160, and user interface section 170. Power section 120 includes charger connection 122. In this embodiment, charging is done via a 5V USB power module directly connected through a USB-micro, or USB-C connector, or indirectly coupled through a magnetic coupler to enable easier conversion from a table-top sensor to portable, wearable sensor. In some embodiments, the portable sensor can rest on a stand such as a business card holder while being charged, then be quickly picked up for portable operation.

Power section 120 also includes battery charger 126 (receiving an input voltage from the charger connection 122), which may be a single-cell Lithium Polymer charger. The battery connects to power regulators 130 which boost or reduce the battery voltage as required by the electronics. For instance, the processor may require 3.3V, some sensors may use 1.8V, and other sensors may require 5V.

Sensor section 140 includes NDIR $CO_2$ sensor 142, and MOX air sensor 144. It may also include humidity/temperature sensor 146. Other sensors 148 may include air sensors that monitor the level of other gases, proximity sensors to sense the distance to objects or individuals, infrared sensors to detect other people or those with elevated temperature, or other sensors with information to be communicated to the user. Although shown as including the NDIR $CO_2$ sensor 142, in another embodiment the NDIR $CO_2$ sensor 142 is omitted in favor of including a photoacoustic sensor or other sensor that is slower but more accurate than the MOX air sensor 144.

Control section 160 includes microcontroller 164 and a programming connector 162 for downloading code. In some embodiments, microcontroller 164 is an MSP430FR2355 by Texas Instruments. In includes non-volatile ferro-electric memory for storing programs and variables to be retained through power cycles. These variables include the user preferences for the user interface and calibration information used to convert raw sensor measurements into $CO_2$ concentrations. Other embodiments could use other microcontrollers, such as those with internal or external flash memory. Optional external interface 166 can be a wireless or wired interface used to communicate measurement results to a phone, tablet or other computing device.

User interface section 170 includes pushbutton switches 176a and 117b visual alerts 174a and 174b, display 172 and haptic feedback 178. In some embodiments, the visual alerts are tricolor LEDs, haptic feedback 178 is a vibrator, and display 172 is used to display sensor values such as $CO_2$ level, TVOC level, graphs, battery charge level and user interface menus. In some embodiments, display 172 is an OLED display with 128×32 pixels, but other embodiments may use displays implemented with other technologies (e.g. LCD or E-Ink) or with other resolutions (e.g. 128×64). Audio feedback 179 may be a speaker that is controlled to produce sounds or synthesized voice to communicate alerts or sensor levels. Switch 176a is pressed to power the circuit on and off and to change settings, while Switch 174b is used to change screens. Visual alert 186a turns yellow or red to indicate high levels of $CO_2$ and visual alert 186b turns yellow or red to indicate high levels of stale air dosage.

As shown in FIG. 1, various components of the sensor section 140, control section 160, and user interface section 180 are interconnected over a bus, such as an inter-integrated circuit (I2C) bus.

Figures 2A, 2B:
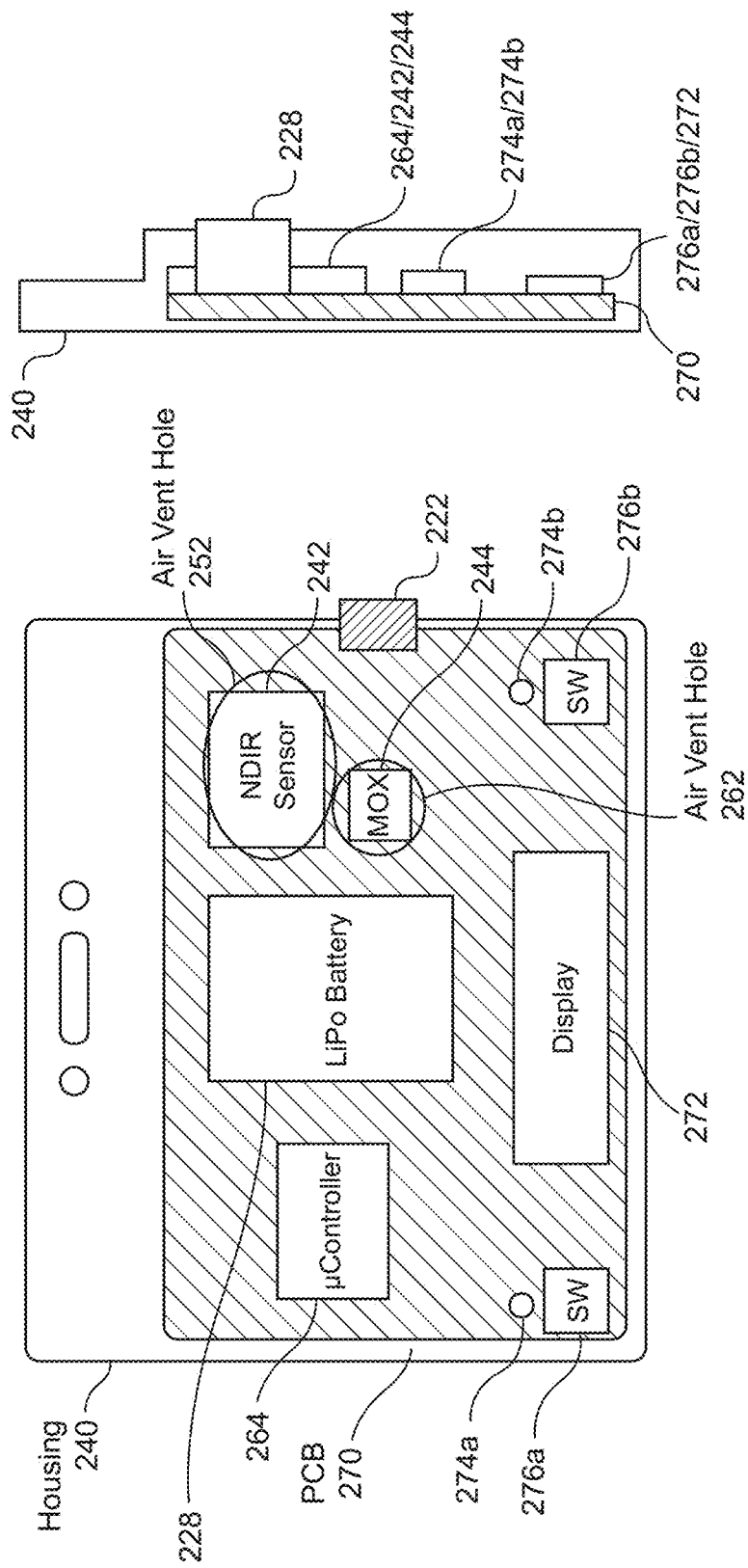
FIG. 2A shows a front view of the physical arrangement of the components of the air monitor.
FIG. 2B shows a side view of the physical arrangement of the components of the air monitor.

FIG. 2A and FIG. 2B show the physical arrangement of components of an embodiment of the air sensor. FIG. 2A is a schematic top plan view of the air sensor. FIG. 2B is a schematic side view of the air sensor of FIG. 2A. Electronic components are mostly surface-mounted on PCB 270 to keep the assembly as thin as possible. In some embodiments, Lithium Polymer battery 228 (also rechargeable battery 128 of FIG. 1) is a 470 maH single cell battery with dimensions 25×35 mm and a thickness of 5.8 mm. The entire assembly, except the thicker NDIR sensor 242, is thin enough to fit inside housing 240, which may be a name badge holder or other thin plastic case. Air vent hole 262 is cut to allow outside air to reach MOX sensor 244, and air vent hole 252 is cut to allow air to reach NDIR sensor 242.

In some embodiments, the air sensor can include a microcontroller 264 that is mounted on the PCB 270. A clear portion of the housing 240 allows display 272 and LEDs 274a and 274b to be visible, but the other parts may be covered by a cosmetic covering that can be a business card, product name, decorative covering, or other message. In some embodiments, the air sensor can include one or more switches (e.g., button 276a, 276b).

In some embodiments, the air sensor can include a connector 222 for electrical connection between the air sensor and an external system or device. The connector 222 can comprise an input/output connection. For example, the connector 222 can comprise a power connection, such as a charger connection 122 (see FIG. 1), and/or a signal connection.

Figure 3:
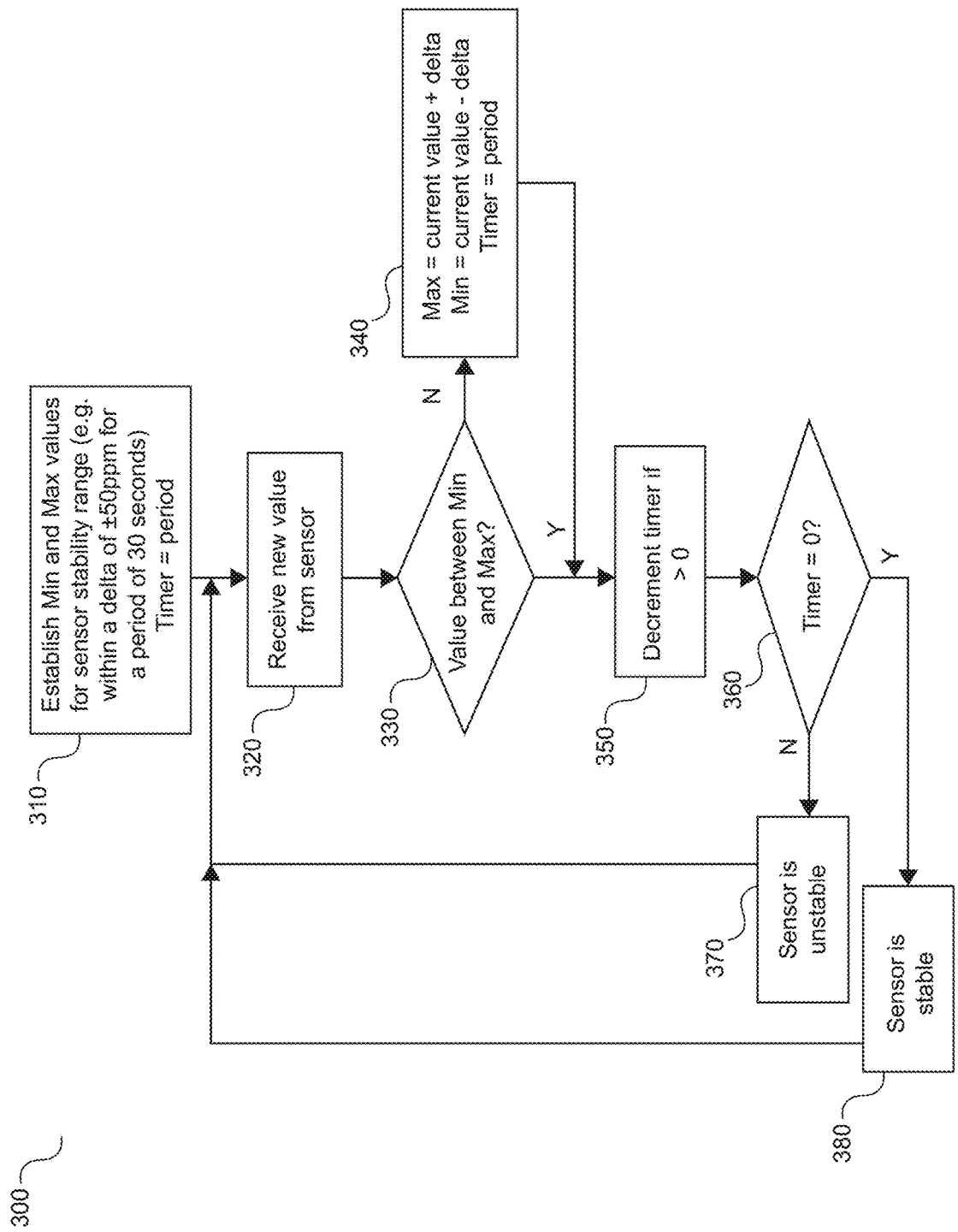
FIG. 3 is a flowchart showing an algorithm for determining the stability of a sensor measurement

FIG. 3 is a flowchart showing algorithm 300 to determine the stability of a sensor reading after the warmup period has been completed. During the warmup period, a sensor value is not utilized. Step 310 establishes an expected measurement range for that sensor and a period of time over which the sensor is not expected to measure values outside this range. For example, in a stable air environment, a $CO_2$ sensor accurate to +−50 parts per million (PPM) may be considered stable if the readings do not deviate from the current reading by more than +−50 PPM for a period of 30 seconds.

In step 320 a new value is obtained from the sensor, and in step 330 the new value is determined to be within, or outside of, the previously saved stability range. If it is outside the range, then in step 340 a new stability range is saved with a Max equal to the current value plus the delta and the Min equal to the current value minus the delta. The stability timer is also reset to the predetermined period. In step 350, the timer is decremented until it reaches zero. The amount of decrement is based on the time between measurements. If this step is reached once per second, then the timer is decremented by one second.

In step 360, the timer value is compared to zero. If it is zero, then the 30 second period has passed with no deviations outside of the stability range, and the sensor is deemed stable in step 380. If, on the other hand, step 360 is reached before the timer equals zero, it means that an instability was detected sometime during the last 30 second period and the sensor is deemed unstable in step 370.

Figure 4A:
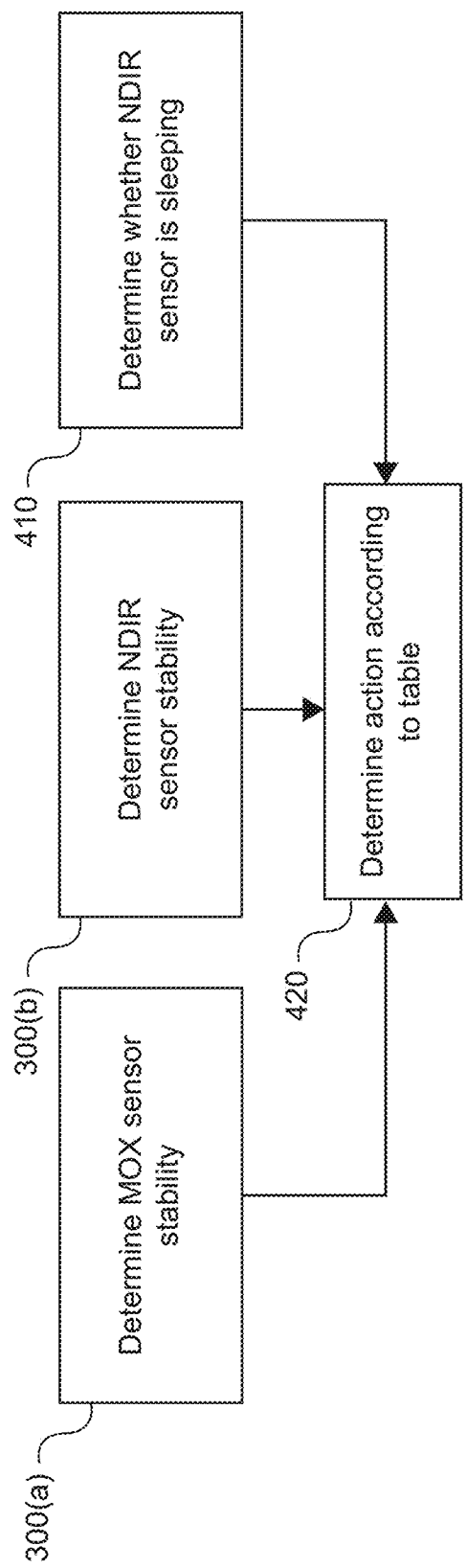
FIG. 4A is a flowchart showing one embodiment of the calibration of a metal oxide (MOX) sensor from a non-dispersive infrared (NDIR) sensor.

FIG. 4A is a flowchart showing one embodiment of the calibration of an MOX sensor output from an NDIR sensor. Although described in the context of specific sensors, other types of sensors are possible. For example, in another embodiment, the NDIR sensor is omitted in favor of a photoacoustic sensor.

In step 300(a), algorithm 300 determines the stability of the equivalent $CO_2$ reading based on an MOX sensor. In step 300(b) algorithm 300 determines the stability of an NDIR sensor. The stability ranges of the two sensors do not need to be identical and can be set based on the characteristics and stability of each sensor.

Step 420 determines whether the NDIR sensor is in a low-power state (sleeping) or a high power state. In the low power state, the NDIR sensor may be powered down by disabling its DC-DC supply. Typical NDIR sensors are powered from a +5V supply via a boost DC-DC converter. Disabling the converter saves the power drawn sensor as well as the power drawn by the converter. In this way, total power consumption is reduced and battery life is extended during periods when the $CO_2$ levels are stable. The user can select high power or power-save mode through the user interface settings screens. In high power mode, accurate NDIR readings are always available. In power-save mode, changes in air quality are quickly detected by the MOX sensor. These changes can alert that air quality is changing and power up the NDIR sensor. However, it may take several minutes until the NDIR sensor is warmed up and is again supplying accurate readings.

After determining the stability of the sensor and sleep state, actions are indicated by the table in FIG. 4B. When the NDIR sensor is awake and the fast-response MOX sensor is unstable (row 00X), indications of changing values are displayed, a yellow or red visual alert may activate, and the haptic feedback may activate to alert to the presence of high $CO_2$ levels.

When the MOX is stable but the NDIR sensor is not yet stable (Row 010), the NDIR sensor is still going through its warmup period and the displayed results should still be based on the MOX estimate of $CO_2$. Once both sensors are stable (Row 011), the NDIR value is displayed and the MOX sensor output is calibrated to make it produce the same or similar $CO_2$ estimates as the NDIR sensor. After both sensors are producing similar, stable results, the NDIR sensor can be put to sleep when in power save mode.

While the NDIR sensor is asleep and the MOX remains stable (Row 11X), the NDIR sensor stays asleep and the display can show either the MOX value or the saved NDIR value because they cannot deviate from each other by more than a small delta value. Once the MOX output becomes unstable (Row 10X), power to the NDIR sensor is restored and it powers up. The calibration in Row 011 allows the MOX sensor to produce good results over a short period of time, even when background organic compounds would otherwise cause it to produce incorrect results. By re-calibrating frequently from the NDIR sensor, the MOX sensor output adapts to changing conditions such as variations in humidity, temperature and background VOCs such as those produced by food preparation.

In another embodiment, the NDIR sensor is assumed to be stable (with correct readings) any time it has been powered up longer than the warmup period. Typical NDIR sensors have a warmup period of 1 to 3 minutes. In this embodiment, when the MOX sensor becomes unstable, a countdown timer is started with the approximate delay required for the NDIR sensor to react to a sudden $CO_2$ change. This delay is approximately 20 seconds with some sensors. After this delay time has expired, the $CO_2$ sensor offset is changed to make its $CO_2$ output equal to the NDIR $CO_2$ value.

Figure 5:
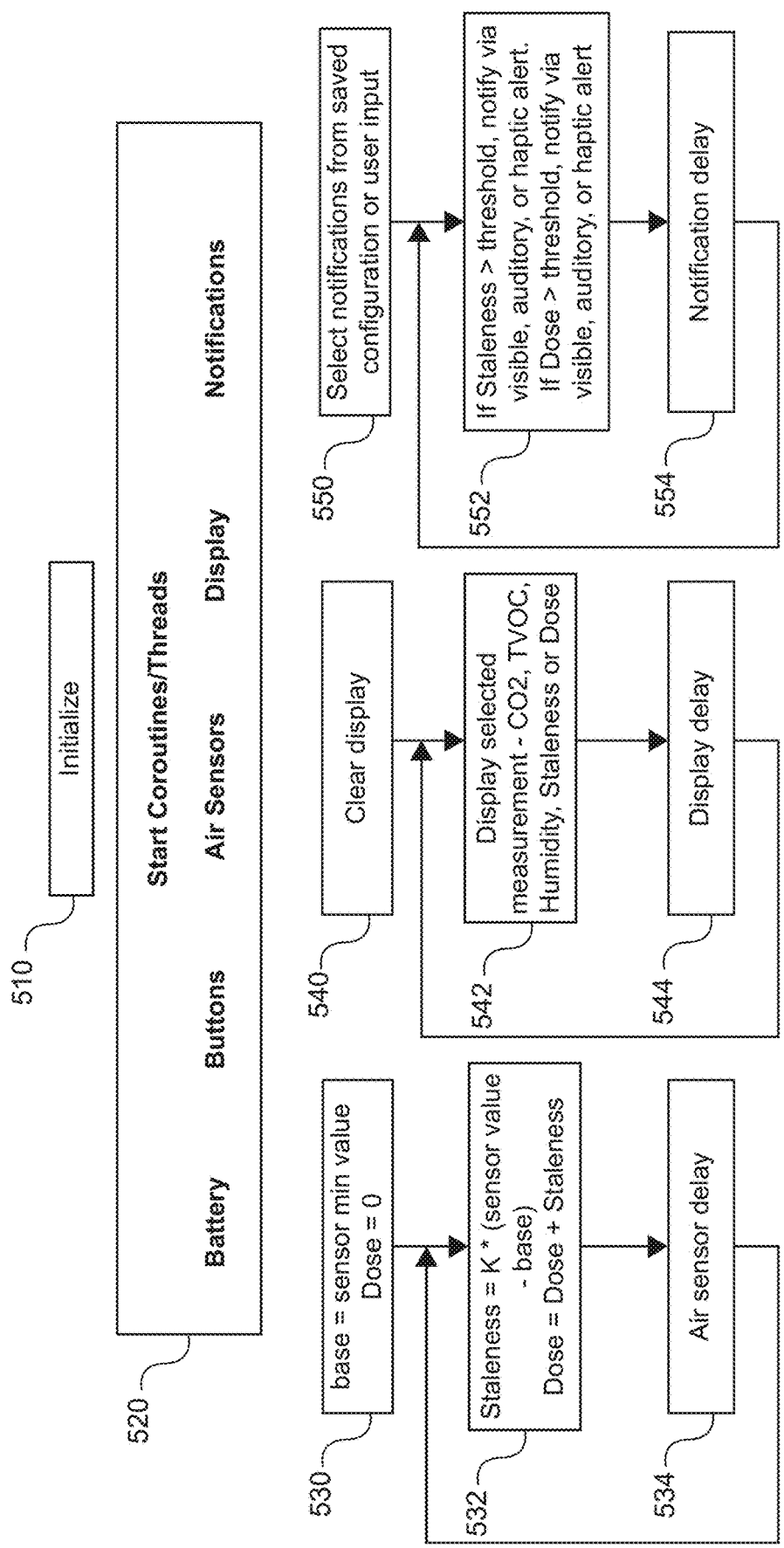
FIG. 5 is a flowchart of software operation of the sensor.

FIG. 5 is a flowchart of software operation of the sensor. In some embodiments Protothreads are used, which are extremely lightweight stackless threads designed for severely memory constrained systems. In step 510, microcontroller 154 is initialized when power is applied.

When the code begins to run, it initializes I/O pins and other devices and in step 520, starts execution of coroutines, tasks or threads to perform the required operations of user interface, sensor, and control operations. These threads may be under the control of a real time operating system, event-driven software, or non-preemptive multitasking software. The use of Protothreads keeps the code size extremely small and facilitates the use of a low-cost microcontroller with very low power dissipation. The threads shown in step 520 have different real time requirements to avoid delays in responding to buttons and in presenting information on the display, while minimizing the execution overhead of non-critical operations such has battery charge and other infrequent operations.

Step 530 shows the beginning an air sensor operation thread. In step 530, an air sensor, such as an NDIR $CO_2$ sensor or photoacoustic sensor has a known minimum value such as the 400 PPM minimum $CO_2$ value of outside air. In step 532 a new value is read from the air sensor. A Staleness value is calculated according to the equation:

$$\text{Staleness} = (CO_2 \text{ PPM} - 400)/600$$

Use of a simple Staleness metric is helpful for those unfamiliar with the risk factors associated with $CO_2$ levels as expressed in PPM. In some embodiments, the division by 600 makes a $CO_2$ level of 1000 PPM equal to a Staleness value of 1, and a $CO_2$ level of 1600 equal to a Staleness value of 2. Staleness=1 (1000 PPM) is approximately the amount of $CO_2$ that will accumulate in a small, unventilated office occupied by one person for an hour, and is also the approximate level at which long term exposure may start to result in headaches or other symptoms. Step 532 also accumulates the Staleness value into a stale Dose metric which can be expressed in stale-air minutes. Dose can be used to compare the total exposure to stale air over a long period of time such as a work shift. Step 534 is a delay before the next execution of the sensor thread to allow other threads to run.

Step 540 begins the operation of a display thread by clearing the display. Step 542 is run each time through the display loop to show updated values of the selected display parameters. Step 544 depicts the delay between display updates. Step 550 depicts the beginning of a notification thread which notifies the user with visible, auditory or haptic feedback based on the users setup preferences. In step 552, a notification is produced bases on a Staleness level. In some embodiments, Staleness>=1 turns visual alert 174a (tricolor LED 274a) yellow and Staleness>=2 turns it red. When stale Dose exceeds 30 minutes, visual alert 174b (tricolor LED 274b) turns yellow and a when the Dose exceeds 60 minutes, it turns it red. Step 554 depicts a delay to allow execution of other threads and to show the indication long enough to be recognized by the user. Not shown in FIG. 5 are flowcharts for other threads such as those to read other sensors, battery voltage and switches.

Figure 6:
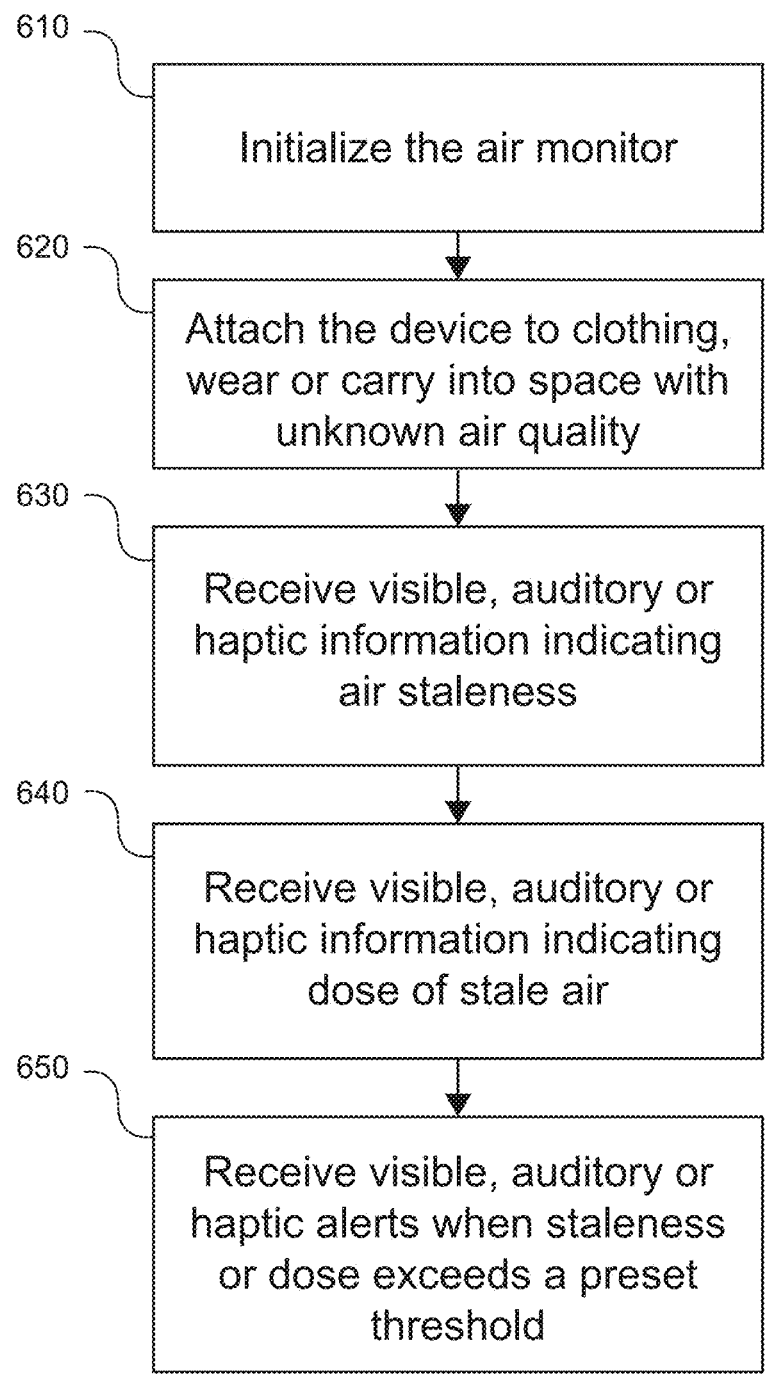
FIG. 6 is a flowchart showing usage of the air monitor.

FIG. 6 is a flowchart showing typical usage of the present invention. Herein, air monitor refers to a complete device according to an embodiment of the present invention. In step 610, the air monitor is initialized after the user powers the device on. Circuitry (not shown) responds to a press of button 176a/276a to connect the battery to power regulators 130 in FIG. 1 to begin operation of microcontroller 164. In step 620, the user wears the device by attaching it with a lanyard, pin, clip or button, or carries the device in a pocket, purse or in a hand. The user then enters an air space with unknown air quality. In step 630, the user receives a visible, auditory or haptic alert regarding the staleness of the air in that space. Information from the sensors may be recorded manually or by taking a photo of the values displayed on the device. The metadata of the photo can be used to timestamp and geo-locate the place where the air measurement took place. In devices with the optional external interface, a cell phone, tablet or other device can record the measurement. In step 640, the user receives information on staleness dose. The dose can be recorded as just described for the staleness values. In step 650, the user receives immediate notification when staleness or dose exceeds a preset threshold.

Figure 7:
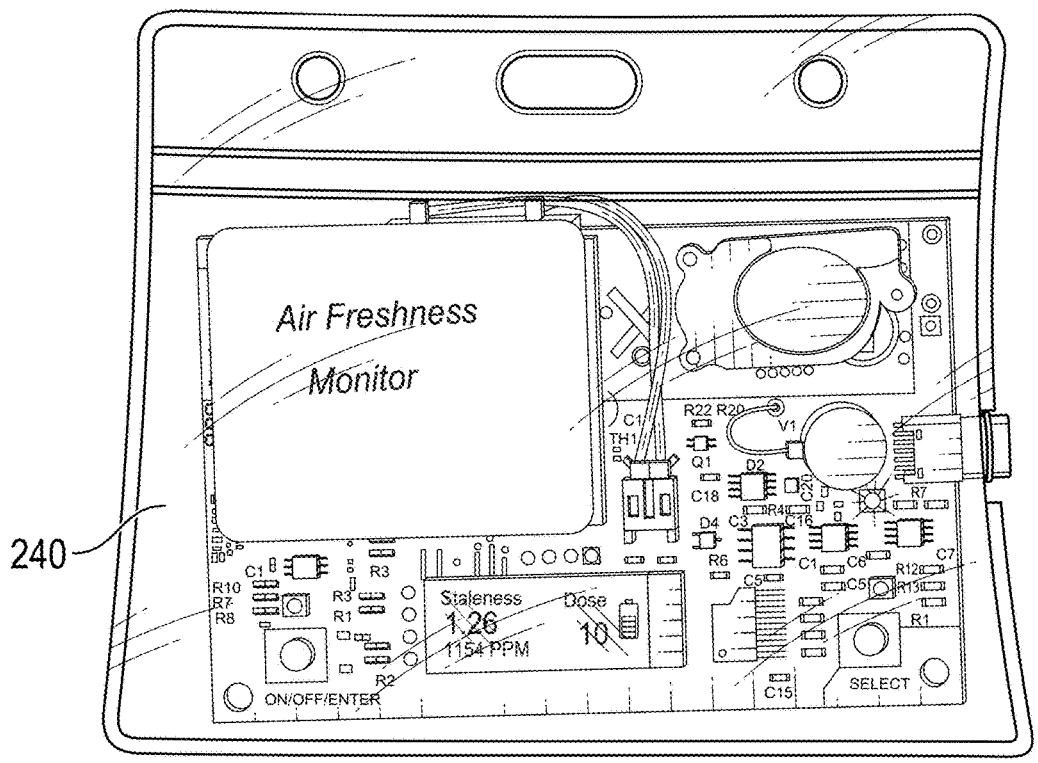
FIG. 7 is an image of a prototype air monitor corresponding to the air monitor of FIG. 2A.
Figure 8:
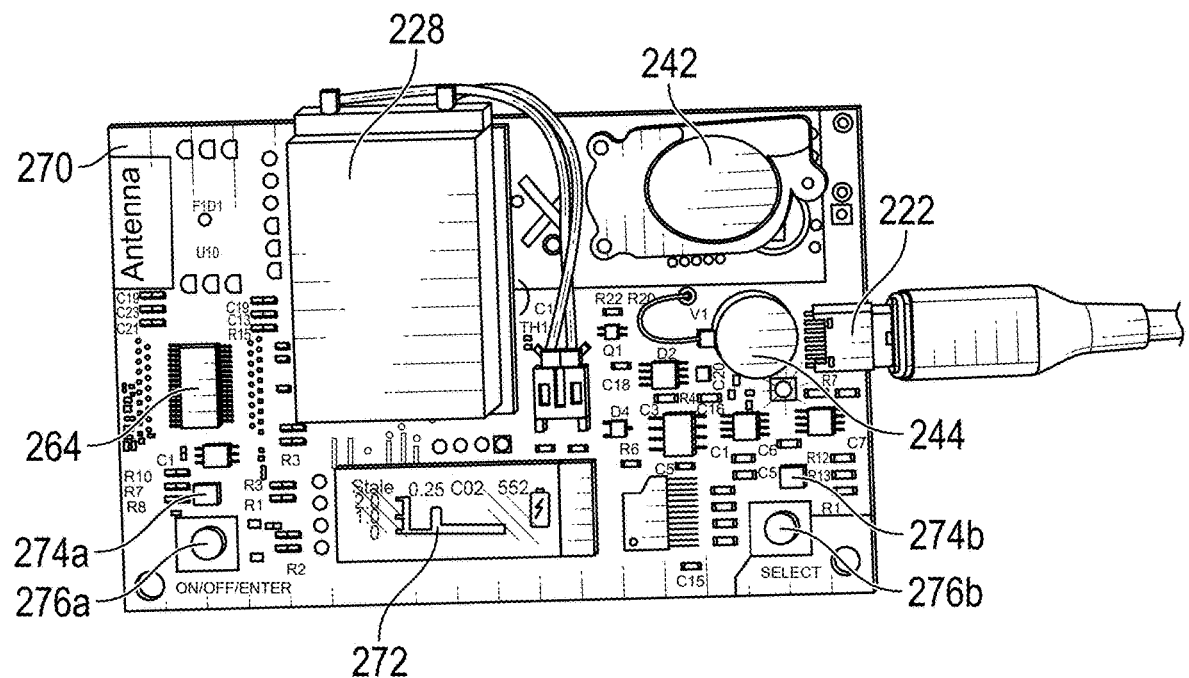
FIG. 8 is an image of a prototype air monitor corresponding to the air monitor of FIG. 2A without a housing while charging.

FIG. 7 is an image of a prototype air monitor corresponding to the air monitor of FIG. 2A according to an embodiment. FIG. 8 is an image of a prototype air monitor corresponding to the air monitor of FIG. 2A without the housing while charging. The air monitor can be charged through a connector 222 (see FIG. 2A).

The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various drawing shown in the figures depict example arrangements of elements and components, additional intervening elements, devices, features, or components may be present in an actual embodiment.

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well. Accordingly, the scope of the present invention is defined only by reference to the appended claims.

What is claimed is:

1. A battery-powered carbon dioxide ($CO_2$) sensor comprising:
   a first sensor configured to provide $CO_2$ measurements to generate a $CO_2$ level;
   a second sensor configured to provide an indicator of changes in the $CO_2$ level, wherein the second sensor is faster than the first sensor in responding to a $CO_2$ concentration change, and wherein the first sensor is configured to provide a higher accuracy $CO_2$ concentration value than the second sensor; and
   a user interface configured to present a combined sensor result of the first sensor and the second sensor.

2. The $CO_2$ sensor of claim 1, wherein a calibration offset value modifies an output of the second sensor such that an output of the first sensor and the output of the second sensor give similar results when the output of the first sensor and the output of the second sensor have stable values.

3. The $CO_2$ sensor of claim 1, wherein the first sensor comprises a non-dispersive infrared (NDIR) sensor or a photoacoustic sensor.

4. The $CO_2$ sensor of claim 3, wherein the second sensor comprises a metal oxide (MOX) sensor.

5. The $CO_2$ sensor of claim 1, wherein the user interface comprises a display, and the combined sensor result is displayed on the display.

6. The $CO_2$ sensor of claim 1, wherein the first sensor, the second sensor, and the user interface are mounted on a printed circuit board (PCB).

7. The $CO_2$ sensor of claim 6, further comprising a battery and a microcontroller mounted on the PCB.

8. The $CO_2$ sensor of claim 6, wherein the first sensor, the second sensor, and the user interface are packaged in a housing, the housing comprises a vent hole that at least partially provides a fluidic pathway between the first sensor and an outside environment.

9. The $CO_2$ sensor of claim 8, wherein at least a portion of the housing being transparent such that the user interface is visible through the portion of the housing.

10. The $CO_2$ sensor of claim 9, further comprising a connector for electrical connection between the $CO_2$ sensor and an external system.

* * * * *